(12) United States Patent
Eoff et al.

(10) Patent No.: US 7,091,159 B2
(45) Date of Patent: Aug. 15, 2006

(54) COMPOSITIONS FOR AND METHODS OF STABILIZING SUBTERRANEAN FORMATIONS CONTAINING CLAYS

(75) Inventors: Larry S. Eoff, Duncan, OK (US); B. Raghava Reddy, Duncan, OK (US); J. Michael Wilson, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 269 days.

(21) Appl. No.: 10/236,722

(22) Filed: Sep. 6, 2002

(65) Prior Publication Data

US 2004/0045712 A1 Mar. 11, 2004

(51) Int. Cl.
*C09K 8/12* (2006.01)

(52) U.S. Cl. .................. 507/120; 507/119; 507/222; 507/224; 507/225; 526/206; 166/305.1

(58) Field of Classification Search ............... 507/119, 507/120, 224, 222, 225; 526/206; 166/305.1
See application file for complete search history.

(56) References Cited

U.S. PATENT DOCUMENTS

| | | | |
|---|---|---|---|
| 2,863,832 A | 12/1958 | Perrine ..................... 252/8.55 |
| 2,910,436 A | 10/1959 | Fatt et al. .................. 252/8.55 |
| 3,215,199 A | 11/1965 | Dilgren ........................ 166/38 |
| 3,251,415 A | 5/1966 | Bombardieri et al. ......... 166/42 |
| 3,297,090 A | 1/1967 | Dilgren ........................ 166/38 |
| 3,307,630 A | 3/1967 | Dilgren et al. ................ 166/38 |
| 3,382,924 A | 5/1968 | Veley et al. .................. 166/42 |
| 3,434,971 A | 3/1969 | Atkins et al. ............. 252/8.55 |
| 3,441,085 A | 4/1969 | Gidley ........................ 166/307 |
| 3,451,818 A | 6/1969 | Wareham ...................... 96/78 |
| 3,744,566 A | 7/1973 | Szabo et al. |
| 3,910,862 A | 10/1975 | Barabas et al. ............. 260/79.3 |
| 4,129,183 A | 12/1978 | Kalfoglou ................... 166/300 |
| 4,142,595 A | 3/1979 | Anderson et al. |
| 4,158,521 A | 6/1979 | Anderson et al. .......... 405/264 |
| 4,158,726 A * | 6/1979 | Kamada et al. ............. 526/200 |
| 4,299,710 A | 11/1981 | Dupre et al. ............. 252/8.5 A |
| 4,366,071 A | 12/1982 | McLaughlin et al. .. 252/8.55 R |
| 4,366,072 A | 12/1982 | McLaughlin et al. .. 252/8.55 R |
| 4,366,073 A | 12/1982 | McLaughlin et al. .. 252/8.55 R |
| 4,366,074 A | 12/1982 | McLaughlin et al. .. 252/8.55 R |
| 4,374,739 A | 2/1983 | McLaughlin et al. .. 252/8.55 R |
| 4,393,939 A | 7/1983 | Smith et al. ................ 166/293 |
| 4,395,340 A | 7/1983 | McLaughlin ........... 252/8.55 D |
| 4,401,789 A | 8/1983 | Gideon ....................... 524/827 |
| 4,439,334 A | 3/1984 | Borchardt ............. 252/8.55 D |
| 4,440,649 A | 4/1984 | Loftin et al. ............. 252/8.5 C |
| 4,447,342 A | 5/1984 | Borchardt et al. ..... 252/8.55 D |
| 4,460,627 A | 7/1984 | Weaver et al. .............. 427/212 |
| 4,462,718 A | 7/1984 | McLaughlin et al. ....... 405/264 |
| 4,532,052 A | 7/1985 | Weaver et al. ......... 252/8.55 R |
| 4,536,297 A | 8/1985 | Loftin et al. ............. 252/8.5 C |
| 4,536,303 A * | 8/1985 | Borchardt .................... 507/222 |
| 4,536,305 A | 8/1985 | Borchardt et al. ..... 252/8.55 R |
| 4,554,081 A * | 11/1985 | Borchardt et al. ........... 507/121 |
| 4,563,292 A * | 1/1986 | Borchardt .................... 507/222 |
| 4,604,216 A | 8/1986 | Irvin et al. .................. 252/8.51 |
| 4,627,926 A | 12/1986 | Peiffer et al. .......... 252/8.55 R |
| 4,671,883 A * | 6/1987 | Connell et al. .............. 507/107 |
| 4,693,639 A | 9/1987 | Hollenbeak et al. ........ 405/263 |
| 4,699,722 A | 10/1987 | Dymond et al. .......... 252/8.551 |
| 4,730,028 A | 3/1988 | Bock et al. .................. 526/225 |
| 4,828,726 A | 5/1989 | Himes et al. ............. 252/8.553 |
| 4,959,432 A | 9/1990 | Fan et al. .................... 526/287 |
| 5,071,934 A | 12/1991 | Peiffer ......................... 526/307 |
| 5,097,904 A | 3/1992 | Himes ......................... 166/294 |
| 5,146,986 A | 9/1992 | Dalrymple ................... 166/294 |
| 5,160,642 A | 11/1992 | Schield et al. ............ 252/8.551 |
| 5,197,544 A | 3/1993 | Himes ......................... 166/294 |
| 5,208,216 A | 5/1993 | Williamson et al. ........ 507/120 |
| 5,244,042 A | 9/1993 | Dovan et al. ................ 166/270 |
| 5,271,466 A | 12/1993 | Harms ......................... 166/300 |
| 5,342,530 A | 8/1994 | Aften et al. .............. 252/8.551 |
| 5,379,841 A | 1/1995 | Pusch et al. ................. 166/295 |
| 5,382,371 A | 1/1995 | Stahl et al. |
| 5,607,902 A | 3/1997 | Smith et al. ................. 507/120 |
| 5,646,093 A | 7/1997 | Dino |
| 5,669,456 A | 9/1997 | Audibert et al. ............... 175/72 |
| 5,728,653 A | 3/1998 | Audibert et al. |
| 5,735,349 A | 4/1998 | Dawson et al. ............. 166/295 |
| 5,887,653 A | 3/1999 | Bishop et al. .............. 166/281 |
| 5,944,106 A | 8/1999 | Dalrymple et al. ......... 166/281 |
| 5,972,848 A | 10/1999 | Audibert et al. ............ 507/119 |

(Continued)

FOREIGN PATENT DOCUMENTS

DE 2 250 552 10/1972

(Continued)

OTHER PUBLICATIONS

Paper entitled "Controlling Formation Damage Using Clay Stabilizers: A Review", by Z.J. Zhou et al., dated 1995.
Botermans, C. Wouter, et al, *Relative Permeability Modifiers: Myth or Reality?*, SPE eLibrary Paper No. 68973, 2001, Society of Petroleum Engineers, Inc., presented at SPE European Formation Damage Conference, The Hague, The Netherlands, May 21-22, pp. 1-2, printed from website @ http://speonline.spe.org/cgi-bin/viewpaper.cgi?paper=00068973.pdf.

(Continued)

*Primary Examiner*—Philip C. Tucker
(74) *Attorney, Agent, or Firm*—Craig W. Roddy; Baker Botts L.L.P.

(57) ABSTRACT

A composition of matter for use in stablizing shale formations in earth boreholes comprising polymeric products, e.g., polymers of a dialkyl aminoalkyl methacrylate, which can optionally be quaternized with an alkyl halide to produce drilling fluid additives which stablize borehole formations containing reactive clays in the presence of an aqueous medium.

6 Claims, No Drawings

U.S. PATENT DOCUMENTS

| | | | |
|---|---|---|---|
| 5,979,557 A | 11/1999 | Card et al. | 166/300 |
| 6,020,289 A | 2/2000 | Dymond | |
| 6,070,664 A | 6/2000 | Dalrymple et al. | 166/281 |
| 6,124,245 A * | 9/2000 | Patel | 507/120 |
| 6,187,839 B1 | 2/2001 | Eoff et al. | 523/130 |
| 6,228,812 B1 | 5/2001 | Dawson et al. | 507/221 |
| 6,237,687 B1 | 5/2001 | Barbee, Jr. et al. | 166/278 |
| 6,253,851 B1 | 7/2001 | Schroeder, Jr. et al. | 166/278 |
| 6,277,900 B1 | 8/2001 | Oswald et al. | 523/130 |
| 6,283,210 B1 | 9/2001 | Soliman et al. | 166/270 |
| 6,359,047 B1 * | 3/2002 | Thieu et al. | 524/376 |
| 6,364,016 B1 | 4/2002 | Dalrymple et al. | 166/270 |
| 6,380,137 B1 | 4/2002 | Heier et al. | 507/121 |
| 6,476,169 B1 | 11/2002 | Eoff et al. | 526/307.2 |
| 6,476,283 B1 | 11/2002 | Devore et al. | 585/250 |
| 6,497,283 B1 | 12/2002 | Eoff et al. | 166/293 |
| 6,516,885 B1 | 2/2003 | Munday | 166/295 |
| 6,569,983 B1 | 5/2003 | Treybig et al. | 528/102 |
| 6,609,578 B1 | 8/2003 | Patel et al. | 175/64 |
| 6,710,107 B1 | 3/2004 | Audibert et al. | 524/5 |
| 6,787,506 B1 * | 9/2004 | Blair et al. | 507/222 |
| 6,803,348 B1 | 10/2004 | Jones et al. | |
| 2003/0019627 A1 | 1/2003 | Qu et al. | 166/281 |
| 2003/0191030 A1 * | 10/2003 | Blair et al. | 507/225 |
| 2004/0102331 A1 | 5/2004 | Chan et al. | 507/100 |

FOREIGN PATENT DOCUMENTS

| | | |
|---|---|---|
| EP | 0 383 337 A2 | 8/1990 |
| EP | 0 896 122 A2 | 2/1999 |
| EP | 1 033 378 A1 | 9/2000 |
| EP | 1 193 365 A1 | 4/2002 |
| EP | 1 312 753 A1 | 5/2003 |
| GB | 2 221 940 A | 2/1990 |
| GB | 2335428 A | 9/1999 |
| WO | WO 93/15164 | 8/1993 |
| WO | WO 99/49183 | 9/1999 |
| WO | WO 99/50530 | 10/1999 |
| WO | WO 00/78890 A1 | 12/2000 |
| WO | WO 02/097236 A1 | 12/2002 |
| WO | WO 03/056130 A1 | 7/2003 |
| WO | WO 2004/094781 A1 | 11/2004 |

OTHER PUBLICATIONS

Eoff, Larry, et al, *Structure and Process Optimization for the Use of a Polymeric Relative-Permeability Modifier in Conformance Control*, SPE eLibrary Paper No. 64985, 2001, Society of Petroleum Engineers, Inc., presented at SPE International Symposium on Oilfield Chemistry, Houston, TX, Feb. 13-16, pp. 1-2, printed from website @ http://speonline.spe.org/cgi-bin/viewpaper.cgi?paper=00064985.pdf.

Inikori, Solomon Ovueferaye, *Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.

Halliburton, 2001 Press Releases, *Halliburton Technology Uses Revolutionary Polymer System to Control Unwanted Water Production*, 2002 Halliburton, pp. 1-2, printed from website @ www.halliburton.com/news/archive/2001/esqnws_053101.isp?printMe.

Halliburton, 2001 Press Releases, *First Halliburton H2Zero™ Conformance Solution Job Performed for a Producing Well in Egypt*, 2002 Halliburton, pp. 1-2, printed from website @ www.halliburton.com/news/archive/2001/esqnws_111901.isp.

Halliburton, 2001 Press Releases, *Halliburton Performs First H2Zero™ Conformance Solution Job in North America*, 2002 Halliburton, pp. 1-2, printed from website @ www.halliburton.com/news/archive/2001/esqnws_082201.isp.

BJ Services Company, *Aquacon, Product Information*, Aug. 1, 2001, pp. 1-2.

BJ Services Company, *Aquatrol I, Product Information*, Dec. 14, 2000, pp. 1-2.

SPE 64985 entitled "Structure and Process Optimization for The Use Of A Polymeric Relative-Permeability Modifier in Conformance Control" by Larry S. Eoff et al, dated 2001.

SPE 68973 entitled "Relative Permeability Modifiers: Myth or Reality" by C. Wouter Botermans et al., dated 2001.

* cited by examiner

COMPOSITIONS FOR AND METHODS OF STABILIZING SUBTERRANEAN FORMATIONS CONTAINING CLAYS

BACKGROUND OF THE INVENTION

1. Field of the Invention

The present invention relates to polymeric compositions that can be used to stabilize reactive clays in subterranean formations and to a method of stabilizing such reactive clays.

2. Description of the Prior Art

In the drilling of oil and gas wells and other such boreholes, it is generally necessary to use a drilling fluid that performs a variety of functions but is primarily used to lubricate the drill bit and carry the cuttings to the surface. It is not uncommon to encounter formations during the drilling process that are argillaceous. These argillaceous formations contain clay (shale) particles, the proportion of which can vary over a wide range. When these argillaceous formations are encountered, and if a water based drilling fluid is employed, complex chemical reactions take place within the argillaceous formation, including ion exchange, hydration, etc. These reactions result in swelling, crumbling or dispersion of the clay or shale particles in the formation through which the drill bit passes. Indeed, the problems can become so severe that washout and even complete collapse of the borehole can occur.

In an attempt to solve these problems, additives are included in the aqueous drilling fluid that are designed to arrest or slow down fluid invasion into the formation by forming an impermeable or semi-impermeable membrane on the surface of the borehole. For example, sodium silicate-based drilling fluids are believed to form such semi-impermeable membranes and are commonly used for maintaining shale stability. Other drilling fluid systems have also been used to deal with the problem of shale stabilization. For example, U.S. Pat. No. 4,299,710 discloses a drilling fluid comprising an aqueous solution of a combination of thickeners such as a copolymer and a polysaccharide. Additionally, U.S. Pat. No. 5,972,848 discloses a method for stabilizing shale formations by employing an aqueous solution containing a polymer with a hydrophilic group and a hydrophobic group.

SUMMARY OF THE INVENTION

In one preferred aspect, the present invention provides a composition of matter comprising a polymeric product selected from the group consisting of:

(1) polymers of a first monomeric component selected from the group consisting of (a) compounds having the formula:

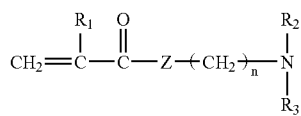
                                  I wherein Z is oxygen or NH, $R_1$ is H or $CH_3$, $R_2$ and $R_3$ are independently alkyl groups containing from 1 to 3 carbon atoms, and n is from 1 to 3, (b) quaternized compounds of Formula I obtained by reacting compounds of Formula I with an alkyl halide having the formula:

$R_4 X$                                                               II wherein $R_4$ is an alkyl group containing from 1 to 22 carbon atoms and X is a halide ion, and (c) mixtures of (a) and (b), (2) polymers of compounds having the Formula I which have been polymersized and then quaternized with compounds having the Formula II, (3) polymeric mixtures of (1) and (2), and (4) polymers of compound (a) or (b) and a second monomeric component selected from the group consisting of (d) vinyl pyrrolidone (e) compounds of the formula:

$CH_2=C(R_1)-CO-Z-R_4$                   III and mixtures of (d) and (e), (5) polymers of compounds (d) and (e) provided that Z is NH, (6) polymeric mixtures of (1) and (4), and (7) polymeric mixtures of (2) and (4).

In another preferred aspect of the present invention, there is provided a method of stabilizing borehole formations containing reactive clays in the presence of water comprising contacting the formation with an aqueous medium containing of a polymeric product as described above.

DESCRIPTION OF THE PREFERRED EMBODIMENTS

In a preferred form, the present invention involves hydrophobically modifying water-soluble polymers by adding water-insoluble groupings into the polymer to an extent that does not render the water-soluble polymer insoluble in water; i.e., its water solubility remains.

As can be seen from the formulas above, the composition of the present invention can take the form of a number of polymeric products which include:

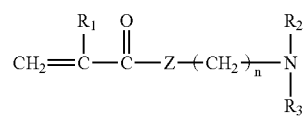
                                  I wherein Z is oxygen or NH, $R_1$ is H or $CH_3$, $R_2$ and $R_3$ are independently alkyl groups containing from 1 to 3 carbon atoms, and n is from 1 to 3, (b) quaternized compounds of Formula I obtained by reacting compounds of Formula I with an alkyl halide having the formula:

$R_4 X$                                                               II wherein $R_4$ is an alkyl group containing from 1 to 22 carbon atoms and X is a halide ion, and (c) mixtures of (a) and (b), (2) polymers of compounds having the Formula I which have been polymersized and then quaternized with compounds having the Formula II, (3) polymeric mixtures of (1) and (2), and (4) polymers of compound (a) or (b) and a second monomeric component selected from the group consisting of (d) vinyl pyrrolidone (e) compounds of the formula:

$CH_2=C(R_1)-CO-Z-R_4$                   III and mixtures of (d) and (e), (5) polymers of compounds (d) and (e) provided that Z is NH, (6) polymeric mixtures of (1) and (4), and (7) polymeric mixtures of (2) and (4).

Compounds having the Formulas I and III can comprise an acrylic/methacrylic acid derivative, referred to herein generally as "acrylic acid derivative".

Generally speaking, when the first and second monomeric components are used to form a copolymer, the molar ratio of the first monomeric component to the second monomeric component will be from about 2:98 to 10:90.

The polymers of the present invention can be prepared by several methods. For example, if one desires to use a polymer of compounds having Formula I, a homopolymer can be made. Where first and second monomeric components are employed, one of the first monomeric components can be reacted with one of the second monomeric components to produce a co-polymer of the first and second monomeric components. It will also be apparent that many other variations of preparing the compositions of the present invention can be employed. Thus, a co-polymer can be made from an acrylic acid derivative having the structure of the Formula I and a quaternized version of the acrylic acid derivative having the structure of Formula I.

As can also be seen, polymer products obtained by mixing polymers described above can be employed. In yet another method, the acrylic acid derivative that has not been quaternized can be polymerized to form a polymer of the desired molecular weight, following which it can be quaternized to the desired degree by reaction with the alkyl halide.

The molecular weight of the polymers of the present invention can vary over wide limits with molecular weights (wt. average) ranging from 50,000 to 500,000 being considered "low" molecular weight polymers, while copolymers having molecular weights ranging from 500,000 to 5,000,000 being considered "high" molecular weight polymers.

The modified, i.e., quaternized polymers, of the present invention can be made by two methods:

Method 1

In this method, the acrylic acid derivative is reacted with the desired alkyl halide, which results in the alkyl halide attaching to the terminal nitrogen and quaternization of the nitrogen. This modified, quaternized monomer is isolated and can then be copolymerized with more of the acrylic acid derivative, (Formula I), vinyl pyrrolidone, a compound of Formula III or a mixture thereof.

Method 2

In this method, the acrylic acid derivative, as described in Formula I, is homopolymerized, following which this polymer is reacted with a suitable alkyl halide in the presence of a surfactant. The surfactant is necessary because of the fact that the alkyl halide is not water soluble whereas the polymerized acrylic acid derivative is. Accordingly, the surfactant acts to solubilize the alkyl halide such that it can react with the terminal nitrogen of the acrylic acid derivative.

The polymers of the present invention have been shown in laboratory testing to vastly reduce shale erosion. A shale erosion test is commonly employed to determine the ability of a drilling fluid and/or the additives therein to prevent a shale from eroding in the presence of an aqueous medium such as an aqueous based drilling fluid. Such erosion, when encountered in actual field conditions in a borehole, and as noted above, can lead to problems ranging from a washout to a complete collapse of the borehole.

A typical shale erosion test is conducted by rolling a weighed portion of sized shale particles in an aqueous medium and then screening the particles to determine the amount of shale that eroded to the point of passing through a selected sized screen. In the shale erosion test used with the compositions of the present invention, U.S. Standard Sieve Series No. 6 and No. 14 screens were employed. The shale was crushed and ground into particles that passed through the 6 mesh screen but were retained on the 14 mesh screen; i.e., particles of a size (−6+14) were used for the erosion test. Equal portions (40.00 g) of the shale were put into one laboratory barrel (350 ml) of each of the various test drilling fluids and rolled at 150° F. for 16 hours. The drilling fluids were then screened through the 14 mesh screen and the retained solids were washed, dried, and weighed. The percent of erosion was calculated based on the weight loss, corrected for the moisture content (7.67%) of the original sample.

The composition of the present invention can be used in fluid for treating subterranean formations including, but not limited to, drilling fluids, completion fluids, remedial fluids and the like. In the method according to the present invention, a drilling fluid containing one of the compositions described above would be incorporated in a suitable amount, e.g., from 1 to 20 lbs/bbl, in the drilling mud or fluid, which, in the conventional fashion, would be circulated in the borehole during the drilling operation. If, during the drilling operation, a formation were encountered that contained a reactive clay, e.g., a clay that had a tendency to erode in the presence of water, the presence of the polymer compositions of the present invention would stabilize the shale, minimizing or ideally stopping the erosion. It is also to be understood that in addition to incorporating the compositions of the present invention in drilling fluids or muds, it can be also used in other downhole fluids under certain circumstances when it is desired to stabilize shale formations.

To more fully illustrate the present invention, the following non-limiting examples are presented:

EXAMPLE 1

A series of polymers was prepared according to Method 1 described above. To prepare a quaternized monomer of Formula I, to a 100 mL round bottom flask is added 16.7 grams of dimethylaminoethyl methacrylate (DMEMA) and 16.2 grams of hexadecyl bromide. The mixture is heated to 110° F. and stirred for 24 hours. The mixture is then poured into 1 liter of petroleum ether, resulting in precipitation of the quaternized monomer. The monomer is collected on a Buchner funnel, washed with excess petroleum ether, collected, and dried in a vacuum dessicator.

To prepare a copolymer, to a 250 ml round bottom flask charge the following: 3.8 grams of DMEMA, 0.7 grams of the quaternized monomer described above, 84.5 grams water, and 1.2 grams concentrated sulfuric acid (to achieve a pH of ~7.1). This solution is then sparged with nitrogen for 30 minutes, followed by the addition of 0.035 grams 2.2'-azobis (2-amidinopropane) dihydrochloride. The resulting solution is then heated under a nitrogen atmosphere, with stirring, to 110° F. and held for 18 hours to produce a highly viscous polymer solution. In all of the test samples in this example, the acrylic acid derivative employed was DMEMA. The alkyl halide employed was an alkyl bromide, the carbon number appearing in the column labeled "Monomeric Component 1" referring to the chain length of the alkyl group. Except as otherwise indicated, each sample contained 1% by weight of the polymer in deionized water. The results are shown in Table 1 below.

TABLE 1

| Sample | Monomeric[3] Component 1 (Mole %) | Monomeric Component 2 | Relative Molecular Weight | % Erosion |
|---|---|---|---|---|
| 1 | — | DMEMA | High | 17 |
| 2[1] | 6% $C_{10}$ | " | " | 7 |
| 3 | " | " | " | 0 |
| 4 | 10% $C_{16}$ | " | " | 1 |
| 5 | 15% $C_{16}$ | " | " | −1 |
| 6 | 20% $C_{16}$ | " | " | −1 |
| 7 | 30% $C_{16}$ | " | " | 11 |
| 8[2] | 4% $C_{18}$ | " | " | 7 |
| 9 | — | " | Low | 10 |
| 10 | 6% $C_{16}$ | " | " | 17 |
| 11 | 15% $C_{16}$ | " | " | 18 |

[1] 2.3 wt. % polymer in water.
[2] 1.6 wt. % polymer in water.
[3] Molar percent of quaternized DMEMA in copolymer.

EXAMPLE 2

In this example, the polymers were also prepared according to the procedure of Method 1 as described above with respect to Example 1. In all cases, the acrylic acid derivative employed was DMEMA, and, unless indicated otherwise, each sample contained 1% by weight of the polymer in deionized water. The results are shown in Table 2 below.

TABLE 2

| Sample | Monomeric[2] Component 1 (Mole %) | Monomeric Component 2 | Relative Molecular Weight | % Erosion |
|---|---|---|---|---|
| 1 | — | VP | High | 33 |
| 2 | 6% $C_{16}$ | " | " | 2 |
| 3 | " | " | Low | 44 |
| 4 | 10% $C_{16}$ | " | " | 16 |
| 5 | 20% $C_{16}$ | " | — | 4.6 |

[1] Vinyl pyrrolidone.
[2] Molar percent of quaternized DMEMA as per Formula III in copolymer.

EXAMPLE 3

In this example, a copolymer was prepared according to Method 2 described above. A homopolymer of DMEMA is prepared as follows. To a 3 L round bottom flask is added 1968.0 grams of water, and this is sparged with nitrogen for 1.5 hours. Next is added 105.0 grams of DMEMA, 25.8 grams concentrated sulfuric acid (to achieve a pH of ~7.9) and 0.46 grams 2.2'-azobis (2-amidinopropane) dihydrochloride. The mixture is then heated under a nitrogen atmosphere, with stirring, to 110° F. and held for 18 hours to produce a highly viscous polymer solution.

The copolymer is produced as follows. To a 250 mL round bottom flask is added 71.0 grams of the DMEMA homopolymer, as described above, followed by 4.0 grams 15% NaOH (to achieve a pH of ~8.9). Next is added 54.6 grams water, 0.36 grams hexadecyl bromide and 0.39 grams benzylcetyldimethylammonium bromide. This mixture is then heated, with stirring, to 140° F. for 24 hours.

The copolymer produced contained 6% (molar) of hexadecyl bromide and was of high molecular weight. A 1% by weight solution of the polymer in deionized water exhibited 0% erosion.

As can be seen from Table 1, a homopolymer of DMEMA which has not been quaternized exhibits some degree of erosion control. It has also been found that a homopolymer of DMEMA subsequently quaternized with hexadecyl bromide and of high molecular weight exhibits a −2% erosion. The foregoing description and examples illustrate selected embodiments of the present invention. In light thereof, variations and modifications will be suggested to one skilled in the art, all of which are in the spirit and purview of this invention.

The invention claimed is:

1. A method of stabilizing borehole formations containing reactive clays in the presence of water comprising:
   contacting said formation with an aqueous medium comprising a composition comprising a polymeric product selected from the group consisting of:
   (1) a polymer of a first monomeric component selected from the group consisting of:
      (a) quaternized compounds obtained by reacting compounds having the formula:

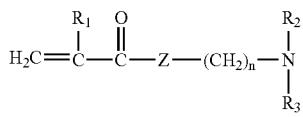

wherein Z is oxygen or NH, $R_1$ is H or $CH_3$, $R_2$ and $R_3$ are independently alkyl groups containing from 1 to 3 carbon atoms, and n is from 1 to 3, with an alkyl halide having the formula:

$$R_4X \qquad \qquad II$$

wherein $R_4$ is an alkyl group containing from 12 to 22 carbon atoms and X is a halide ion, and
      (b) a mixture of the following components: a compound as described in (a) and a compound having the Formula I,
   (2) polymers of compounds having the Formula I which have been polymerized and then quaternized with compounds having the Formula II,
   (3) polymeric mixtures of (1) and (2),
   (4) polymers of compound (a) and a second monomeric component selected from the group consisting of (c) vinyl pyrrolidone, (d) compounds of the formula:

$$CH_2\!=\!C(R_1)\text{—}CO\text{—}Z\text{—}R_4 \qquad \qquad III$$

and mixtures of (c) and (d),
   (5) polymers of a compound having Formula I and a second monomeric component consisting of compounds having Formula III,
   (6) polymers of compounds (c) and (d) provided that Z is NH,
   (7) polymeric mixtures of (1) and (4),
   (8) polymeric mixtures of (2) and (4),
   (9) polymeric mixtures of (1) and (5), and
   (10) polymeric mixtures of (2) and (5).

2. The method of claim 1 wherein said first monomeric component comprises quaternized dimethyl aminoethyl methacrylate.

3. The method of claim 1 wherein said second monomeric component comprises vinyl pyrollidone.

4. The method of claim 1 wherein said second monomeric component comprises compounds having the Formula III.

5. The method of claim 1 wherein said first monomeric component and said second monomeric component are in a molar ratio of from 2:98 to 10:90, respectively.

6. The method of claim 1 wherein said alkyl halide comprises an alkyl bromide.

* * * * *